(12) United States Patent
Lee et al.

(10) Patent No.: US 8,599,490 B2
(45) Date of Patent: Dec. 3, 2013

(54) LIQUID LENS

(75) Inventors: Jeong-yub Lee, Seoul (KR); Cheol-min Park, Seoul (KR); Seung-tae Choi, Hwaseong-si (KR); Seung-wan Lee, Suwon-si (KR); Jong-oh Kwon, Suwon-si (KR); Hee-joon Jung, Cheonan-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 638 days.

(21) Appl. No.: 12/784,625

(22) Filed: May 21, 2010

(65) Prior Publication Data

US 2011/0051254 A1 Mar. 3, 2011

(30) Foreign Application Priority Data

Sep. 3, 2009 (KR) ........................ 10-2009-0082949

(51) Int. Cl.
*G02B 1/06* (2006.01)
*G02B 3/12* (2006.01)

(52) U.S. Cl.
USPC .......................................... 359/665; 359/666

(58) Field of Classification Search
USPC .................................. 359/665–667
See application file for complete search history.

(56) References Cited

U.S. PATENT DOCUMENTS

| | | | |
|---|---|---|---|
| 5,574,598 A | 11/1996 | Koumura et al. | |
| 6,188,526 B1 | 2/2001 | Sasaya et al. | |
| 7,068,439 B2 * | 6/2006 | Esch et al. | 359/665 |
| 7,256,943 B1 | 8/2007 | Kobrin et al. | |
| 7,359,124 B1 | 4/2008 | Fang et al. | |
| 7,369,321 B1 | 5/2008 | Ren et al. | |
| 7,440,193 B2 | 10/2008 | Gunasekaran et al. | |
| 7,580,195 B2 | 8/2009 | Choi et al. | |
| 2007/0030573 A1 | 2/2007 | Batchko et al. | |
| 2007/0201138 A1 | 8/2007 | Lo | |
| 2007/0211207 A1 | 9/2007 | Lo et al. | |
| 2007/0263293 A1 | 11/2007 | Batchko et al. | |
| 2008/0112059 A1 | 5/2008 | Choi et al. | |
| 2008/0144186 A1 * | 6/2008 | Feng et al. | 359/666 |

(Continued)

FOREIGN PATENT DOCUMENTS

| | | |
|---|---|---|
| EP | 2192425 A1 | 6/2010 |
| JP | 6-308303 A | 11/1994 |

(Continued)

OTHER PUBLICATIONS

European Patent Office, Search Report dated Nov. 5, 2010, issued in European Patent Application No. 10171910.2.

(Continued)

*Primary Examiner* — Evelyn A. Lester
(74) *Attorney, Agent, or Firm* — Sughrue Mion, PLLC

(57) ABSTRACT

A variable-focus liquid lens is provided. The liquid lens includes a membrane and a fluid. The membrane is made of a transparent elastomer, and the fluid fills a predetermined space to contact at least a lens surface of the membrane. The membrane and the fluid are respectively made of materials repulsive to each other, for example, hydrophilic and hydrophobic materials or oleophilic and oleophobic materials. Accordingly, a repulsive force between the fluid and the membrane can prevent the absorption or leaking of the fluid into/through the membrane.

27 Claims, 6 Drawing Sheets

(56) References Cited

U.S. PATENT DOCUMENTS

| | | |
|---|---|---|
| 2008/0285143 A1 | 11/2008 | Batchko et al. |
| 2009/0021823 A1 | 1/2009 | Heim et al. |
| 2010/0079873 A1 | 4/2010 | Wang et al. |
| 2010/0118413 A1 | 5/2010 | Kim et al. |
| 2010/0118414 A1 | 5/2010 | Bolis |
| 2010/0182703 A1 | 7/2010 | Bolis |

FOREIGN PATENT DOCUMENTS

| | | |
|---|---|---|
| JP | 7-49404 A | 2/1995 |
| JP | 2000-81503 A | 3/2000 |
| JP | 2009-175536 A | 8/2009 |
| JP | 2010-097200 A | 4/2010 |
| KR | 10-0672373 B1 | 1/2007 |
| KR | 10-2008-0043106 A | 5/2008 |
| KR | 10-2008-0064237 A | 7/2008 |
| WO | 0201277 A2 | 1/2002 |
| WO | WO 2007/017089 A1 | 2/2007 |
| WO | 2008/082025 A1 | 7/2008 |
| WO | WO 2008/100154 A1 | 8/2008 |
| WO | 2009/010562 A1 | 1/2009 |
| WO | 2010/032869 A1 | 3/2010 |

OTHER PUBLICATIONS

European Search Report, dated Nov. 5, 2010, issued in Application No. 10171907.8.
A. Werber, "Tunable, membrane-based, liquid-filled micro-lenses", Laboratory for Micro-optics, The 13th International Conference on Solid-State Sensors, Actuators and Microsystems, Seoul, Korea Jun. 5-6, 2005, vol. 1, pp. 1018-1021.
European Patent Office, Communication dated Apr. 3, 2012 issued in corresponding European Application No. 11181168.3.
Jeong, K.-H., et al., "Tunable Microdoublet Lens Array", Optics Express, May 2004, pp. 2494-2500, vol. 12, No. 11.
European Patent Office, Communication dated Dec. 8, 2011, issued in corresponding European Patent Application No. 11163986.0.

* cited by examiner

US 8,599,490 B2

LIQUID LENS

CROSS REFERENCE TO RELATED APPLICATION

This application claims the priority under 35 U.S.C. §119(a) of Korean Patent Application No. 10-2009-0082949, filed on Sep. 3, 2009, the entire disclosure of which is incorporated herein by reference in its entirety for all purposes.

BACKGROUND

1. Field

The following description relates to an optical lens, and more particularly, to a variable-focus liquid lens.

2. Description of the Related Art

The development of digital technologies is accelerating digital convergence. Applications of digital convergence are most active in the fields of media and communication, and a primary example of a digital convergence product is a mobile communication device. Mobile communication devices are incorporated not only with devices that offer gaming, music playback, broadcasting and Internet functions, but also with image pickup devices such as digital cameras and digital camcorders. In particular, image pickup devices are being widely installed in mobile phones and other mobile electronic devices such as laptop computers and personal digital assistants (PDAs).

Mobile electronic devices equipped with an image pickup device, which has recently gained popularity, are becoming smaller and thinner. Accordingly, image pickup devices are also required to be smaller, lighter, and cost-effective. In particular, the recent trends that a mobile communication device includes not only an image pickup device but also other digital electronic devices (e.g., an MP3 player, a video player, a digital multimedia broadcasting (DMB) television, and the like) contributes to an increase in demands for smaller and cost-effective image pickup devices. Wafer-level image pickup devices are small camera modules designed to meet the demands for smaller, thinner, and more economical image pickup devices.

In early days when mobile electronic devices containing image pickup devices were first available, the demands on the performance (e.g., resolution) of the image pickup devices were not that high. However, as the type of mobile electronic devices equipped with an image pickup device has become more and more diverse to meet the various needs and preferences of consumers, the demands on the performance of image pickup devices is also increasing. For example, image pickup devices of mobile electronic devices had offered a close-up function with a close-up distance of 60 cm, with a fixed focal length. Nowadays, image pickup devices have an auto-focus function, a zoom function, and a close-up function with a close-up distance of 30 cm or less.

To implement the auto-focus function, the zoom function, and the close-up function in image pickup devices, variation in the focal length of a lens is essential. One way of enabling wafer-level image pickup devices to have a variable focus is to use a liquid lens. A liquid lens is an optical lens having a transparent fluid which is contained in a transparent membrane. Specifically, a liquid lens is an optical lens that can change its focal length by applying a predetermined force to the fluid which is contained in a membrane, and thus changing the shape (i.e., curvature) of a surface of the membrane. Since liquid lenses can be manufactured small, they are suitable for use as variable-focus optical lenses of wafer-level image pickup devices.

SUMMARY

The following description relates to a liquid lens which can provide a wafer-level image pickup device with an auto-focus function, a zoom function, and a close-up function.

The following description also relates to a liquid lens which exhibits superior optical performance and improved durability by preventing absorption and penetration of an optical fluid into an optical membrane.

In one general aspect, there is provided a liquid lens including a transparent membrane and a fluid. The membrane is made of a transparent elastomer and includes at least one surface which functions as a lens surface. Such surface of the membrane is referred to as "lens surface." The fluid fills a predetermined space to contact at least the lens surface of the membrane. The membrane and the fluid are respectively made of materials repulsive to each other, for example, hydrophilic and hydrophobic materials or oleophilic and oleophobic materials.

In another aspect, there is provided a liquid lens including a transparent substrate, a spacer frame, a membrane, a fluid, and a fixing frame. The spacer frame is disposed on the transparent substrate to define a space therein, a driving portion, and a lens portion. The membrane is attached onto the spacer frame, covers at least the lens portion of the spacer frame, and is made of a transparent elastomer. The fluid fills the space defined by the spacer frame and is made of a material repulsive to a material of the membrane. The actuator is disposed on the membrane to apply pressure on the fluid in the driving portion. The fixing frame is disposed on the actuator to fix the actuator to the spacer frame.

In another aspect, there is provided a liquid lens including a membrane and a fluid. The membrane is made of a transparent polydimethylsiloxane (PDMS) elastomer and includes at least a lens surface. The fluid fills a predetermined space to contact at least the lens surface of the membrane and is made of transparent dimethylsiloxane (DMS) oil. Any one of the optical membrane and the optical fluid is made of a polar-modified material.

Other features will become apparent to those skilled in the art from the following detailed description, which, taken in conjunction with the attached drawings, discloses exemplary embodiments of the invention.

BRIEF DESCRIPTION OF THE DRAWINGS

FIGS. 2A through 2C respectively are plan and cross-sectional views of the liquid lens of FIG. 1, wherein FIG. 2B is a cross-sectional view of the liquid lens to which a force has not been applied, and FIG. 2C is a cross-sectional view of the liquid lens to which a force has been applied to the driving portion.

Elements, features, and structures are denoted by the same reference numerals throughout the drawings and the detailed description, and the size and proportions of some elements may be exaggerated in the drawings for clarity and convenience.

DETAILED DESCRIPTION

Figure 1:
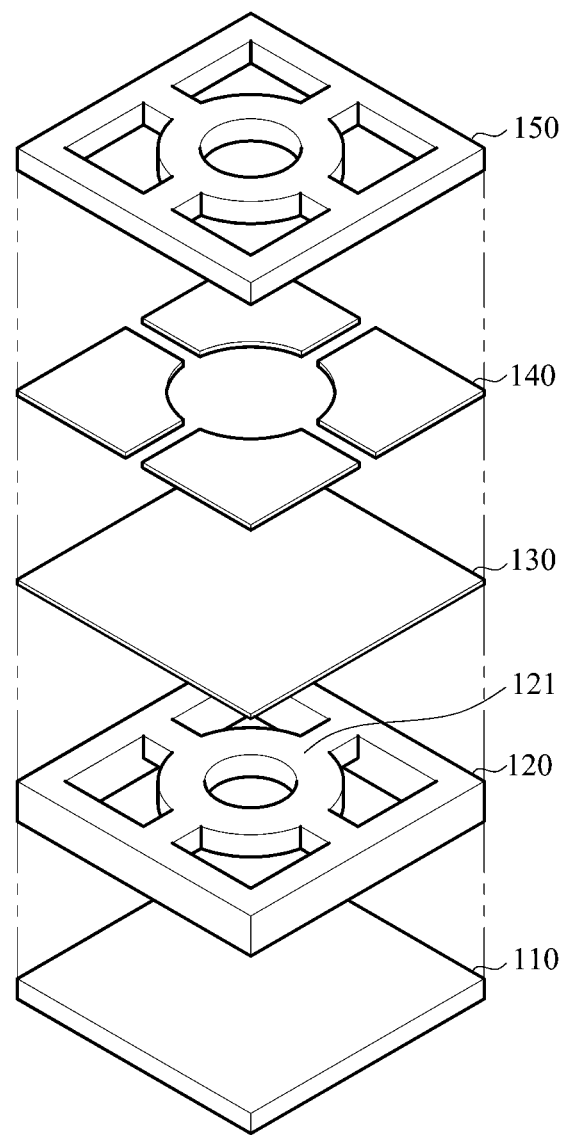
FIG. 1 is an exploded perspective view of an exemplary liquid lens.

Exemplary embodiments are described more fully hereinafter with reference to the accompanying drawings. The terms used in the following description are terms defined taking into consideration the functions obtained in accordance with the present invention, and may be changed in accordance with the option of a user or operator or a usual practice. Therefore, the definitions of these terms should be determined based on the entire content of this specification.

A liquid lens generally includes a transparent, elastic membrane attached to a frame that is filled with a fluid. When the fluid is made to fluctuate by applying a predetermined driving force to the liquid lens, the pressure produced by the flowing fluid is applied to a surface of the membrane, specifically, all or part of the membrane which corresponds to a lens portion of the liquid lens. Such surface is referred to as "lens surface" throughout the disclosure. This pressure changes the shape (i.e., curvature) of the lens surface of the membrane, thereby adjusting focal length of the liquid lens.

A liquid lens can be used alone or added to an imaging optical system of an image pickup device. In the former case, the focal length of the liquid lens can be changed. In the latter case, the focal length of the image pickup device can be changed using the liquid lens. The change in focal length enables the image pickup device to have variable-focus functions such as an auto-focus function, a zoom function, and a close-up function.

A membrane used in a liquid lens should be transparent and chemically stable and have high elasticity. Examples of materials satisfying these requirements include a transparent silicon elastomer (such as a polydimethylsiloxane (PDMS) elastomer, a polymethyl phenyl siloxane (PMPS) elastomer, or a fluoro-silicone elastomer), a hydrocarbon elastomer, a polyether elastomer, a propylene oxide elastomer, and a polyester elastomer.

These elastomers including a silicon elastomer are generally susceptible to heat. To be used as an membrane of a liquid lens, the glass transition temperature Tg of the elastomer must be as high as possible. In addition, the membrane may be exposed to outside of an image pickup device and/or in contact with the external environment. Thus, the membrane should be non-tacky. Otherwise, the optical membrane can be contaminated or damaged (torn) by foreign matter.

Membranes (including a PDMS membrane) made of the above polymers (elastomers) are porous. When a predetermined driving force is applied to a liquid lens which is filled with a fluid, a lens surface of the membrane becomes convex (expands) due to the pressure from the fluid. For any one of the above-described elastomers to be suitable as a membrane of a liquid lens, it is desirable to prevent the permeation or penetration of the fluid into the membrane.

A PDMS elastomer is a membrane material which satisfies the above requirements. A PDMS membrane has high elasticity and transparency and is chemically stable due to its low surface tension and nonionic and non-polar properties. The PDMS membrane is chemically stable not only at a low temperature but also at a high temperature. Furthermore, the PDMS membrane exhibits heat resistance, weather resistance (ultraviolet rays and ozone), and oxidative stability. The glass transition temperature Tg of the PDMS membrane is the highest among silicone polymers. Being non-tacky, the PDMS membrane can be effectively prevented from being contaminated or torn by foreign matter.

A fluid used in a liquid lens should be transparent, non-volatile, and chemically stable. Also, the fluid should have the following physical and chemical properties.

First, the fluid should have a low viscosity, resulting in superior mobility. The viscosity of a liquid affects the flow speed thereof. A low flow speed causes the fluid to respond slowly to a driving signal and makes it difficult to precisely control the flow of the fluid. Specifically, a higher viscosity of a fluid increases the time required for the fluid in a lens portion to deform a lens surface, that is, response time, even when pressure is applied to the fluid in a driving portion by a pressure member such as an actuator. In addition, a high viscosity of a fluid may result in overshooting in which a lens surface is deformed more than expected from the actual pressure applied on the fluid.

In this regard, a liquid lens should use a fluid having as low a viscosity as possible. A specific value of viscosity of a fluid may vary according to the size of a liquid lens and/or a force required to deform a lens portion. For example, when a lens surface has a diameter of 3 mm and when displacement is caused by an actuator whose area is three times the area of the lens surface, a fluid should have a viscosity of 1000 centipoise (cP) or less in order to achieve a response time of 100 ms or less and prevent overshooting.

Second, the optical fluid should exhibit stable characteristics in an operational temperature range (e.g., 30 to 85° C.) of an image pickup device (or a mobile electronic device using the image pickup device) in which a liquid lens is implemented. Specifically, the fluid should remain liquefied within the operational temperature range of the image pickup device. Otherwise, the optical lens may be damaged. Furthermore, the change in the volume or viscosity of the fluid according to temperature change should not be significant within the operational temperature range of the image pickup device. If the volume or viscosity of the fluid changes significantly according to temperature, the performance of the liquid lens may deteriorate, and it may be difficult to precisely control the liquid lens.

Examples of fluids that satisfy the above physical and chemical characteristics include silicone oil and silicone fluid. In addition, transparent hydrocarbon oil, ester oil, ether oil, and perfluoropolyether (PFPE) oil may satisfy the above requirements. In particular, silicone oil is widely used as fluid. Silicone oil remains liquefied in a temperature range of approximately −55 to 200° C. and shows no significant change in its viscosity according to temperature, compared with other materials.

Third, the fluid should display stable physical and chemical characteristics in relation to the membrane in which the fluid is contained. This property of the fluid is a relative property determined by its relationship with a membrane rather than an individual property. Specifically, when a membrane is made of a porous material such as a silicone elastomer, a polyether elastomer, or a polyester elastomer, a fluid should not permeate or penetrate into the membrane at a critical temperature and/or pressure or higher. Moreover, the fluid should not deform a surface of the membrane. If a lens surface of the membrane wrinkles, deterioration of the performance of a liquid lens is unavoidable.

To prevent the permeation or penetration of an fluid into the membrane, an exemplary liquid lens may use a fluid made of a material having a high degree of polymerization. A fluid with a high degree of polymerization has a relatively large molecular size, which, in turn, physically hinders the fluid from permeating or leaking through a porous membrane. For example, when a fluid has a degree of polymerization of 50 or more at a low viscosity of 100 to 2000 cP, the absorption and penetration of the fluid into a membrane can be effectively prevented.

An fluid and a membrane used in an exemplary liquid lens may respectively be made of materials repulsive to each other in order to prevent deformation of a surface of the membrane. In this case, a repulsive force between the fluid and the membrane may prevent the surface of a membrane from being deformed, for example, from wrinkling. As a result, a lens surface of the membrane can remain spherical. Properties of materials, which respectively cause the fluid and the membrane to be repulsive to each other, may be hydrophilic and hydrophobic properties or oleophilic and oleophobic properties. For example, the membrane may be made of a hydrophobic material such as a silicone elastomer or a hydrocarbon elastomer, whereas the fluid is made of a hydrophilic material such as silicone oil, hydrocarbon oil, ester oil, or ether oil. Conversely, the optical membrane may be made of a hydrophilic material such as a silicone elastomer, a hydrocarbon elastomer, a polyether elastomer, or a polyester elastomer, whereas the fluid is made of a hydrophobic material such as silicone oil, hydrocarbon oil, or PFPE oil. Then, the penetration and permeation of the fluid into the membrane can be prevented.

If both of the fluid and the membrane have the same properties (e.g., when they are hydrophobic materials), any one of them (e.g., the fluid) may be polarized to have hydrophilic properties. That is, the polarity of any one of the fluid and the membrane may be modified. For example, when the membrane and the fluid are respectively made of a PDMS elastomer and dimethylsiloxane (DMS) oil, respectively, both of which have hydrophobic properties, the polarity of any one of the PDMS elastomer and the DMS oil may be modified to have hydrophilic properties.

The polarity of the hydrophobic PDMS elastomer or the hydrophobic DMS oil can be modified in various ways. For example, in any one of the PDMS elastomer and the DMS oil, some of methyl groups attached to silicon may be substituted by another group having a polarity (e.g., an organic group having a relatively large dipole moment such as a hydroxy group (—OH), an amino group (—NH$_2$), a carboxylic group (—COOH), a fluoro-alkyl group (—CF$_4$), or a polyether group). In this case, if the proportion of methyl groups, which are substituted, is increased to be equal to or higher than a predetermined percentage (e.g., 20%), the DMS oil or the PDMS elastomer can, as a whole, be polarized to have hydrophilic properties.

As described above, an exemplary liquid lens includes a membrane made of an elastomer which is transparent and chemically stable and has high elasticity, such as a silicone elastomer, a hydrocarbon elastomer, a polyether elastomer, or a polyester elastomer. Further, the exemplary liquid lens includes an fluid made of a material which is transparent, non-volatile, and physically and chemically stable in an operational temperature range of an image pickup device, and exhibits superior mobility due to its low viscosity, such as silicone oil, hydrocarbon oil, ester oil, ether oil, polyether oil, or PFPE oil. In particular, fluid may be made of a material having a high degree of polymerization even at a low viscosity. In addition, any one of the optical membrane and the fluid may be hydrophilic (or oleophobic), and the other one may be hydrophobic (or oleophilic), so that a repulsive force acts between the optical membrane and the fluid.

Hereinafter, the specific structure and operation of a liquid lens which uses the above materials as an fluid and an optical membrane will be described in detail. A liquid lens described below is a variable-focus liquid lens included in a wafer-level image pickup device. However, it is obvious to those of ordinary skill in the art that the variable-focus is only an exemplary application.

Figure 2A:
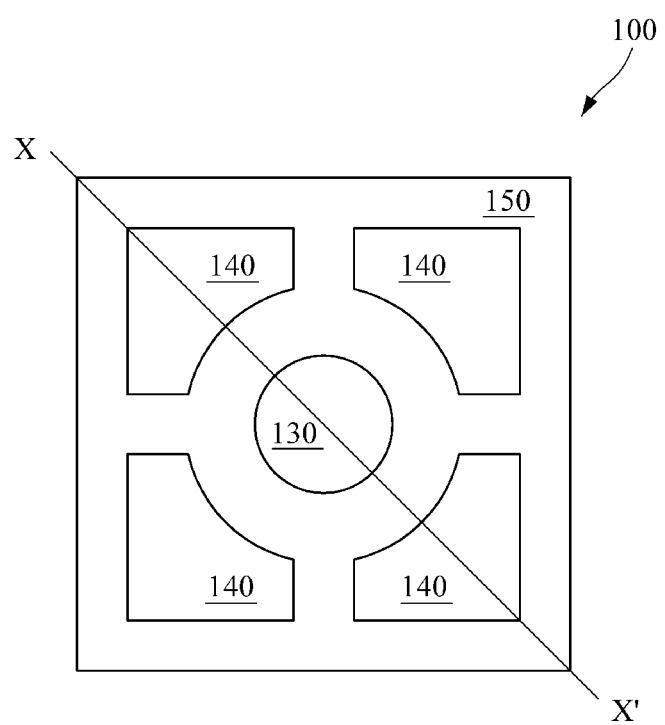
Figure 2B:
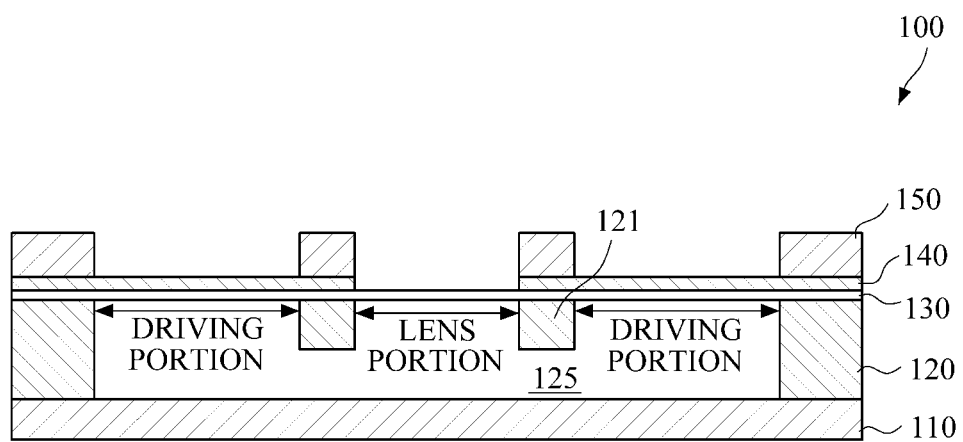
Figure 2C:
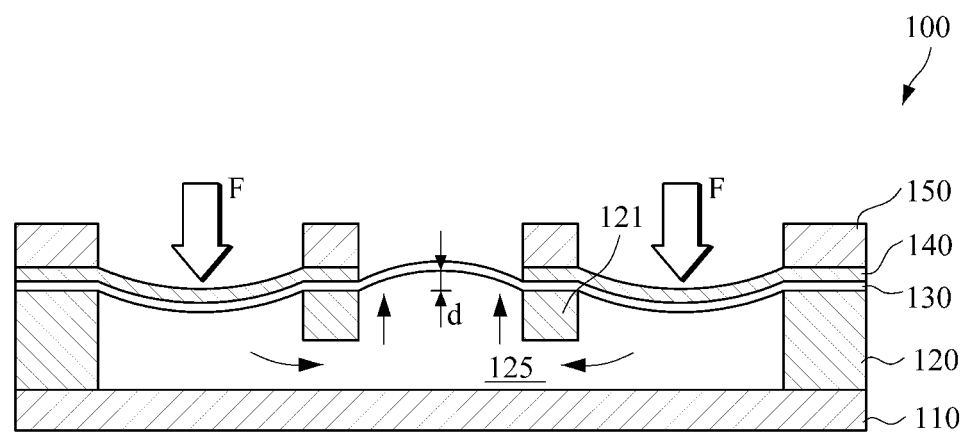

FIG. 1 is an exploded perspective view of an exemplary liquid lens 100. FIGS. 2A through 2C respectively are plan and cross-sectional views showing the structure and operation of the liquid lens 100 of FIG. 1. Here, FIGS. 2B and 2C are cross-sectional views of the liquid lens 100 taken along the line X-X' of FIG. 2A. Specifically, FIG. 2B is a cross-sectional view of the liquid lens 100 to which a driving force has not been applied. FIG. 2C is a cross-sectional view of the liquid lens 100 to which a driving force has been applied. Referring to FIGS. 1 through 2C, the liquid lens 100 includes a substrate 110, a spacer frame 120, an fluid 125, a membrane 130, an actuator 140, and a fixing frame 150.

The substrate 110 is made of a transparent material and is not limited to a particular type of substrate. For example, the substrate 110 may be a glass substrate or a transparent polymer substrate. The substrate 110 enables the liquid lens 100 to be fixed to another module (e.g., an imaging optical system) of an image pickup device and functions as a bottom surface of the spacer frame 120. The space formed by the substrate 110 and the spacer frame 120 contains the fluid 125. That is, the substrate 110 functions as an element of a frame which seals the fluid 125 therein.

In the drawings, the spacer frame 120 is disposed between the substrate 110 and the membrane 130. However, this is merely an example. For example, the fluid 125 may be sealed in the space defined only by the membrane 130 of the liquid lens 100, or the spacer frame 120, which defines a space, is interposed between two membrane 130.

The spacer frame 120 has a structure that defines a space that can contain the fluid 125. The spacer frame 120 may be made of an opaque material such as silicone. However, the material of the spacer frame 120 is not limited to the opaque material. The space defined by the spacer frame 120 may be divided into a lens portion and a driving portion. The lens portion and the driving portion may be defined by through holes formed in the spacer frame. These through holes are formed to fluid communicate therebetween so that a pressure applied to the area defining the driving portion causes flowing of the liquid in driving portion toward the lens portion. In an embodiment, an upper portion of the space frame 120 has a partition frame 121 that divides the space into the lens portion and the driving portion, and a lower portion of the space may not be divided. Accordingly, the fluid 125 can freely flow in the lower portion of the space defined by the spacer frame 120.

The lens portion is filled with the fluid 125 and functions as a lens through which incident light passes. The driving portion delivers a driving force that can change the profile of a portion (a lens surface) of the optical membrane 130 which covers the lens portion. More specifically, referring to FIG. 2C, when a predetermined pressure F is applied onto the driving portion by the actuator 140, the fluid 125 in the driving portion flows to the lens portion, thereby increasing the amount of the fluid 125 in the lens portion. Accordingly, the lens portion bulges upward, that is, becomes the shape of a convex lens having a bulge which protrudes a distance "d." Here, it is obvious that the shape of the lens portion, that is, the size of the bulge "d" can be arbitrarily controlled by adjusting the pressure applied onto the driving portion by the actuator 140.

The lens portion may be located in the middle of the space defined by the spacer frame 120, and the driving portion may surround the lens portion. If the driving portion surrounds the lens portion, a driving force (i.e., the pressure F) applied onto the driving portion may cause the fluid 125 in the driving portion to flow to the lens portion from all directions. Such flow of the liquid may be uniform. Accordingly, the shape of the lens portion may be changed to the shape of an almost spherical convex lens. As a result, a variable-focus liquid lens having superior optical performance can be realized. The driving portion may be divided into a plurality of regions. For example, as shown in the drawings, the driving portion may be arranged symmetrically. In an exemplary embodiment shown in the drawings, the driving portion is divided into four regions by a partition frame 121, which are symmetrical to each other, each surrounds the lens portion. Alternatively, the driving portion may be divided into another number of regions (two, three, or five or more regions).

The fluid 125 fills the space defined by the spacer frame 120. As described above, the fluid 125 may be made of a material which is transparent, non-volatile, and physically and chemically stable in an operational temperature range of an image pickup device, and exhibits superior mobility due to its low viscosity, such as silicone oil, hydrocarbon oil, ester oil, ether oil, polyether oil, or PFPE oil. In the current example, the fluid 125 may be a material which has a high degree of polymerization at a low viscosity and is repulsive to a material used as the optical membrane 130.

Of the above-described materials that can be used as the fluid 125, silicone oil is most widely used. Silicone oil is transparent. In addition, silicone oil remains liquefied and is physically and chemically stable in an operational temperature range of an image pickup device. In particular, the change in the viscosity of silicone oil according to temperature is less significant than the changes in the viscosities of other materials. Silicone oil has a siloxane chain structure (i.e., [—O—Si-]n) using —O—Si— as a basic unit. The type of silicone oil may determine the type of an element or a group attached to a silicon (Si) element of a siloxane chain. In addition, the type of the element or group attached to the silicon element may determine properties (e.g., hydrophilic or hydrophobic properties) of the silicone oil.

Examples of such silicone oil include methyl phenyl siloxane (MPS) oil and DMS oil. Both of MPS oil and DMS oil have a siloxane chain structure which contain —O—Si— as a basic unit. In MPS oil, methyl and phenyl groups are attached to the silicon element, wherein the content of methyl and phenyl groups may vary but the content of phenyl groups may not be small (e.g., 20% or more). In DMS oil, only methyl groups are attached to the silicon element.

A methyl group has a lower molecular weight and a smaller dipole moment than other organic groups (such as a phenyl group, a vinyl group, and a carboxyl group). Thus, DMS oil has a higher mobility than other silicon liquids. In addition, DMS oil has a higher degree of polymerization (represented by the number of —O—Si— which is a basic unit of silicone oil) than other silicone oils at the same viscosity, resulting in not only a high molecular weight but also a large molecular size of a unit polymer. For example, at a viscosity of 500 cP, the degree of polymerization of DMS oil is 190, whereas that of MPS oil with a phenyl content of 44% is only 17. This indicates that polymer molecules of DMS oil are ten or more times larger than those of MPS oil at the same viscosity of 500 cP.

As described above, DMS oil has a larger molecular size than other silicone oils even at a low viscosity of, e.g., 1000 cP or less. A liquid lens using DMS oil with a relatively low viscosity can support faster response time and prevent overshooting. In addition, a liquid lens using DMS oil with a relatively high degree of polymerization can prevent or minimize the permeation or penetration of an fluid into a membrane.

For example, when the membrane 130 of the liquid lens 100 is made of PDMS, if MPS oil is used as the fluid 125, the fluid 125 may penetrate into the optical membrane 130 under the pressure which is used to form a 30 µm lens sag. This is because MPS oil has a low degree of polymerization. Here, the term "sag" (indicated by reference character "d" in FIG. 2C) denotes the difference in height between a highest point and a lowest point of a liquid lens when the flat liquid lens becomes convex. Therefore, a larger bulge indicates a greater pressure applied onto a membrane by a fluid. On the other hand, when the membrane 130 of the liquid lens 100 is made of PDMS, if DMS oil is used as the fluid 125, the fluid 125 may not penetrate into the membrane 130 even under the pressure of a 700 µm or greater lens bulge. The specific size of the sag "d" which causes the fluid 125 to penetrate into the membrane 130 may vary according to the specific shape of the liquid lens 100 (the size of the lens portion and/or the pressure applied by the actuator 140 and the area of the driving portion to which the pressure is applied).

DMS oil can be more effectively prevented from permeating or penetrating into a membrane than other silicone oils or hydrocarbon oils which have been mentioned above as fluids. Since DMS oil has hydrophobic (or oleophilic) properties, if a material having hydrophobic (or oleophilic) properties (e.g., a non-tacky PDMS elastomer) is used as a membrane, a portion of the membrane which contacts DMS oil may easily wrinkle due to the affinity between the fluid and the membrane (both are hydrophobic). In particular, there is a high affinity between an fluid and a membrane (e.g., between DMS oil and a PDMS membrane) which have the same molecular structure. This causes the membrane to wrinkle easily, thereby making a lens surface rough. Consequently, it becomes difficult to obtain a spherical lens with a superior profile, which, in turn, deteriorates the optical performance of a liquid lens.

To solve this problem, the fluid 125 and the optical membrane 130 may be made of materials which are repulsive to each other. For example, the membrane 130 may be made of a hydrophobic PDMS elastomer. In this case, the fluid 125 may be made of hydrophilic silicone oil or other hydrophobic materials. If the fluid 125 is to be made of a hydrophobic material having a high degree of polymerization (e.g., DMS oil) even at a low viscosity, the polarity of the hydrophobic material may be changed using a polar modification material which can then be used as the fluid 125. In the case of DMS oil, for example, some of methyl groups may be substituted by another group having a polarity (e.g., an organic group having a larger dipole moment than a methyl group, such as a hydroxy group, an amino group, a carboxylic group, a fluoroalkyl group, or a polyether group). Accordingly, the hydrophobic DMS oil may be changed to a hydrophilic DMS oil.

Figure 3A:
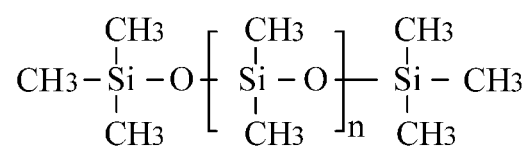
FIG. 3A is a diagram showing a molecular formula of dimethylsiloxane (DMS) oil.
Figure 3B:
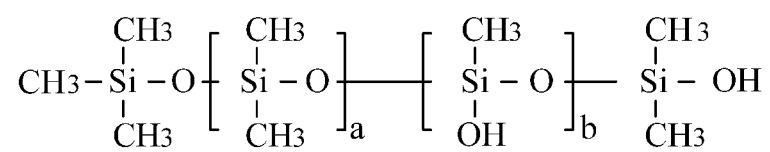
FIG. 3B is a diagram showing a molecular formula of the DMS oil of FIG. 3A which has been modified to become hydrophilic.

FIG. 3A is a diagram showing a molecular structure of DMS oil. Referring to FIG. 3A, organic groups attached to all silicon elements that form a siloxane chain in DMS oil are methyl groups. Overall, a methyl group has non-polar (hydrophobic) properties due to its small dipole moment. FIG. 3B is a diagram showing an exemplary molecular structure of the DMS oil of FIG. 3A which has been modified to become hydrophilic. To obtain the hydrophilic DMS oil shown in FIG. 3B, some methyl groups ("b" methyl groups in a side chain and one methyl group in an end chain) of the DMS oil of FIG. 3A have been substituted by hydroxyl groups having a relatively large dipole moment. In this way, if some (e.g., 20% or more) of methyl groups attached to silicon in DMS oil are substituted by another organic group having polarity, the overall properties of the fluid 125 may become hydrophilic. Here, the number of methyl groups that may be substituted in order to change the polarity of the fluid 125 may vary according to the type of an element or an organic group that is substituted for the methyl groups.

Referring back to FIGS. 1 through 2C, the membrane 130 is attached to the spacer frame 120 on the side opposite to the side where the substrate 110 is attached, thereby sealing the fluid 125 in the space defined by the spacer frame 120. The type of material of the membrane 130 has been described in detail above, and thus a description thereof will be omitted. Since an outer surface of the membrane 130 is externally exposed, it is likely to contact air or foreign matter. For this reason, the membrane 130 should be non-tacky (e.g., a PDMS elastomer). On the other hand, since an inner surface of the membrane 130 contacts the fluid 125 (e.g., DMS oil), it should be repulsive to the fluid 125.

If the membrane 130 is to be formed as a single film, a material used to form the membrane 130 must satisfy the above two requirements. For example, when the membrane 130 is made of a stable, non-tacky, hydrophobic, and non-polar PDMS elastomer, the fluid 125 may be made of hydrophilic, polarized DMS oil. On the other hand, when the fluid 125 is made of DMS oil which is a stable, non-polar fluid, the membrane 130 may have a dual membrane structure in which an outer membrane is made of a non-tacky material (e.g., a hydrophobic, non-polar PDMS elastomer) and an inner membrane may be made of a hydrophilic, polarized PDMS elastomer.

The entire flat surface of the membrane 130 may be shaped like a sheet or may be divided into a plurality of regions to cover the driving portion and the lens portion of the spacer frame 120. Alternatively, the membrane 120 may cover the lens portion of the spacer frame 120 but may not necessarily cover the driving portion. For example, when the fluid 125 can be sealed by the actuator 140 which is made of a polymer, the membrane 130 may not necessarily cover the driving portion.

The actuator 140 is disposed on the membrane 130 to correspond to the driving portion. When the driving portion is divided into a plurality of regions, a plurality of actuators may be respectively disposed on the regions of the driving portion. The actuator 140 may be bonded onto the membrane 130 by a bonding member. When a driving force is applied to the actuator 140, the actuator 140 exerts pressure on the fluid 125 in the driving portion, thereby causing the fluid 125 to flow to the lens portion. As a result, the membrane 130 on the lens portion, that is, the lens surface bulges upward. To this end, referring to FIGS. 2B and 2C, the actuator 140 may remain parallel to the transparent substrate 110 when receiving no driving voltage and may bulge downward when receiving a driving voltage. The degree to which the actuator 140 bulges may be controlled by adjusting the amount of the driving voltage applied to the actuator 140. The actuator 140 is only an example of a pressure member used to apply pressure on the fluid 125 of the lens portion. Instead of the actuator 140, a micropump may also be used to cause the fluid 125 to flow to the lens portion.

There are no particular restrictions on the type or material of the actuator 140. That is, various conventional actuators can be used. For example, the actuator 140 may be an electro active polymer (EAP) actuator which is very thin and consumes low power or a relaxor ferroelectric polymer actuator which is made of a copolymer such as poly(vinylidene fluoride-trifluoroethylene-chlorofluoroethylene) (P(VDF-TrFE-CFE)). When the actuator 140 is disposed on the membrane 130 as shown in the drawings, a material, which can reliably and permanently bond the actuator 140 to the membrane 130, may be used to form the actuator 140 or may be added to the material of the actuator 140 in order to improve the durability of the actuator 140 and enable the actuator 140 to efficiently deliver a driving force to the fluid 125. For example, when the membrane 130 is made of a silicone elastomer, the actuator 140 made of a polymer may additionally be coated with a silicone material.

The fixing frame 150 disposed on the actuator 140 securely fixes the membrane 130 and/or the actuator 140 to the spacer frame 120. The fixing frame 150 has a planar shape that exposes at least the lens portion. The fixing frame 150 may also expose the actuator 140. For example, the planar shape of the fixing frame 150 may be identical to that of the spacer frame 120 which is divided into the driving portion and the lens portion. There are no particular restrictions on the material of the fixing frame 150. The fixing frame 150 may be made of, e.g., silicon.

A liquid lens described above can offer an auto-focus function, a zoom function, and a close-up function by controlling whether to apply a driving force using an actuator or the intensity of the driving force. In particular, the liquid lens can prevent the absorption and penetration of an fluid into a membrane, thereby improving its durability. Furthermore, since a lens portion of the membrane can be prevented from being deformed by the fluid, the deterioration of optical performance of the liquid lens can be prevented.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A liquid lens comprising:
   a membrane which is made of a transparent elastomer and comprises a lens surface; and
   a fluid which fills a predetermined space while in contact with the lens surface of the membrane and is made of a material repulsive to the material which forms the membrane,
   wherein the optical membrane is made of a polydimethylsiloxane (PDMS) elastomer, and the fluid is made of dimethylsiloxane (DMS) oil.

2. The liquid lens of claim 1, wherein the membrane is made of a hydrophobic material, and the fluid is made of a hydrophilic material.

3. The liquid lens of claim 2, wherein the fluid is made of polarized dimethylsiloxane (DMS) oil.

4. The liquid lens of claim 3, wherein the polarized DMS oil is obtained by substituting at least a part of methyl groups contained in DMS oil with an organic group having a greater dipole moment than that of methyl group.

5. The liquid lens of claim 4, wherein the organic group comprises at least one of a hydroxy group, an amino group, a carboxylic group, a fluoro-alkyl group, or a polyether group.

6. The liquid lens of claim 1, wherein the membrane is made of a hydrophilic material, and the liquid is made of a hydrophobic material.

7. The liquid lens of claim 6, wherein the optical membrane is made of a polarized polydimethylsiloxane (PDMS) elastomer.

8. The liquid lens of claim 7, wherein the polarized PDMS elastomer is obtained by substituting at least a part of methyl groups contained in a PDMS elastomer with an organic group having a greater dipole moment than that of methyl group.

9. The liquid lens of claim 8, wherein the organic group comprises at least one of a hydroxy group, an amino group, a carboxylic group, a fluoro-alkyl group, or a polyether group.

10. A liquid lens comprising:
a membrane which is made of a transparent elastomer and comprises a lens surface; and
a fluid which fills a predetermined space while in contact with the lens surface of the membrane and is made of a material repulsive to the material which forms the membrane,
wherein the membrane comprises an outer membrane made of a hydrophobic material and an inner membrane made of a hydrophilic material, and the fluid is made of a hydrophobic material.

11. The liquid lens of claim 10, wherein the membrane comprises an outer membrane made of a hydrophobic polydimethylsiloxane (PDMS) elastomer and an inner membrane made of a polarized, hydrophilic PDMS elastomer, and the fluid is made of hydrophobic dimethylsiloxane (DMS) oil.

12. The liquid lens of claim 11, wherein the polarized PDMS elastomer is obtained by substituting at least a part of methyl groups contained in a PDMS elastomer with an organic group having a greater dipole moment than that of methyl group.

13. The liquid lens of claim 12, wherein the organic group comprises at least one of a hydroxy group, an amino group, a carboxylic group, a fluoro-alkyl group, or a polyether group.

14. A liquid lens comprising:
a membrane which is made of a transparent elastomer and comprises a lens surface; and
a fluid which fills a predetermined space while in contact with the lens surface of the membrane and is made of a material repulsive to the material which forms the membrane, wherein the fluid is silicone oil having a degree of polymerization of 50 or more at a viscosity of 100 to 2000 cP.

15. A liquid lens comprising:
a transparent substrate;
a spacer frame which is disposed on the transparent substrate to define a space, said space comprising a driving portion and a lens portion, and the driving portion and the lens portion are fluid communicate to each other;
a membrane which is attached onto the spacer frame, is made of a transparent elastomer, and covers at least the lens portion;
a fluid is contained in the space and is made of a material repulsive to a material of the membrane;
an actuator which is disposed on the membrane to apply pressure to the fluid in the driving portion; and
a fixing frame which is disposed on the actuator to fix the actuator to the spacer frame,
wherein the optical membrane is made of a polydimethylsiloxane (PDMS) elastomer, and the fluid is made of dimethylsiloxane (DMS) oil.

16. The liquid lens of claim 15, wherein the lens portion is disposed in the middle of the space, and the driving portion surrounds the lens portion.

17. The liquid lens of claim 15, wherein the spacer is divided into a first portion and a second portion, wherein the first portion comprises a partition frame which is divides the space into the driving portion and the lens portion, and the second portion is not divided.

18. The liquid lens of claim 15, wherein the membrane is made of a hydrophobic material, and the fluid is made of a hydrophilic material.

19. The liquid lens of claim 18, wherein the fluid is made of polarized dimethylsiloxane (DMS) oil.

20. The liquid lens of claim 15, wherein the membrane is made of a hydrophilic material, and the optical liquid is made of a hydrophobic material.

21. The liquid lens of claim 20, wherein the membrane is made of a polarized polydimethylsiloxane (PDMS) elastomer.

22. A liquid lens comprising:
a transparent substrate;
a spacer frame which is disposed on the transparent substrate to define a space, said space comprising a driving portion and a lens portion, and the driving portion and the lens portion are fluid communicate to each other;
a membrane which is attached onto the spacer frame, is made of a transparent elastomer, and covers at least the lens portion;
a fluid is contained in the space and is made of a material repulsive to a material of the membrane;
an actuator which is disposed on the membrane to apply pressure to the fluid in the driving portion; and
a fixing frame which is disposed on the actuator to fix the actuator to the spacer frame,
wherein the membrane comprises an outer membrane made of a hydrophobic material and an inner membrane made of a hydrophilic material, and the fluid is made of a hydrophobic material.

23. The liquid lens of claim 22, wherein the membrane comprises an outer membrane made of a hydrophobic PDMS elastomer and an inner membrane made of a polarized, hydrophilic PDMS elastomer, and the fluid is made of hydrophobic DMS oil.

24. A liquid lens comprising:
a transparent substrate;
a spacer frame which is disposed on the transparent substrate to define a space, said space comprising a driving portion and a lens portion, and the driving portion and the lens portion are fluid communicate to each other;
a membrane which is attached onto the spacer frame, is made of a transparent elastomer, and covers at least the lens portion;
a fluid is contained in the space and is made of a material repulsive to a material of the membrane;
an actuator which is disposed on the membrane to apply pressure to the fluid in the driving portion; and
a fixing frame which is disposed on the actuator to fix the actuator to the spacer frame,
wherein the fluid is silicone oil having a degree of polymerization of 50 or more at a viscosity of 100 to 2000 cP.

25. A liquid lens comprising:
a membrane which is made of a transparent polydimethylsiloxane (PDMS) elastomer and comprises a lens surface; and
a fluid which fills a predetermined space while in contact with the lens surface of the optical membrane and is made of a transparent dimethylsiloxane (DMS) oil,
wherein one of the membrane or the fluid is made of a polarized material.

26. The liquid lens of claim 25, wherein the fluid is made of a hydrophilic DMS oil which is obtained by substituting at least a part of methyl groups contained in DMS oil with an organic group having a greater dipole moment than that of methyl group, and the optical membrane is made of a hydrophobic PDMS elastomer.

27. The liquid lens of claim 25, wherein the fluid is made of a hydrophobic DMS oil, and the membrane comprises an outer membrane made of a hydrophobic PDMS elastomer and an inner membrane made of a hydrophilic PDMS elastomer which is obtained by substituting at least a part of methyl groups contained in a PDMS elastomer with an organic group having a greater dipole moment than that of methyl group.

* * * * *